United States Patent Office 3,137,618
Patented June 16, 1964

3,137,618
METHOD OF MAKING A GRANULAR PESTI-
CIDE COMPOSITION CONTAINING A LIQ-
UID PESTICIDE
David A. Pearce, Mission, Kans., assignor to Chemagro
Corporation, New York, N.Y., a corporation of New
York
No Drawing. Filed Jan. 21, 1960, Ser. No. 3,739
10 Claims. (Cl. 167—42)

The present invention relates to pesticides and more particularly to granular pesticides having an active ingredient coated on the surface of inert granules and to methods of manufacturing them.

Pesticides are commonly applied to plants and in other applications as liquid and solid compositions, and the solid compositions include both dusts and granular materials which differ in particle size. The selection of the form of the composition used depends upon the place or material to be treated with the pesticides, and for certain applications, such as the crowns of certain plants, the bottom of lakes and ponds and in blending with soils, the granular compositions are preferred. Such compositions more readily reach the crown of the plants and the lake bottoms than do dusts and sprays and they are more readily handled and mixed with soil.

In manufacturing granular pesticides, the technique employed depends upon the nature of the active ingredient and different techniques must be employed for liquids and solid active agents. In the case of liquids, with which the present invention is concerned, the liquid must be dispersed in a solid carrier so that the composition will have a granular form and the technique generally employed is to coat the liquid on the surface of particles of a solid granular material. Two techniques are in current use for the coating operation. In the first, a liquid pesticide is sprayed onto absorbent granules while they are tumbled or blended and the liquid is absorbed onto and into the granules which may be attapulgite, montmorillonite, expanded vermiculite or perlite. The pesticide is absorbed into the interior of the granules and, hence is not adequately available in many instances to act. In addition, many absorbent materials tend to decompose or to accelerate the decomposition of many liquid pesticides.

In the second method, the liquid pesticide is blended with a finely divided absorbent such as clay and the mixture is coated onto particles of silica sand by rolling pressure in a Muller as, for example, described in Les Veaux U.S. Patent 2,777,795. This method requires the use of special equipment such as a Simpson Muller and is limited to use with very hard, rounded particles which roll easily, such as wind-classified beach sand because the method requires rolling pressure to impact the pesticide mixture on granules.

Accordingly, it is the object of the present invention to provide a pesticidal composition having granules of non-absorbent material covered with a coating which contains a liquid pesticide.

It is a further object of the present invention to provide a method for manufacturing such compositions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the scope of the invention will become apparent to those skilled in the art from this detailed description.

The present invention overcomes the inadequacies of the above compositions and attains the objects of the invention by providing a composition containing granules of a non-absorbent base coated with a liquid pesticide and also obtaining finely divided absorbent material and methods for preparing them. Briefly stated, the method consists of blending the liquid pesticide with granules of a non-absorbent base material until the granules are evenly covered and then blending into the mixture a more finely divided absorbent material. Other materials may be included in the composition such as surfactants which aid in dispersing the pesticide when applied to soil or water and thickening agents which may be added to the liquid pesticide before blending with the granular material.

This method is not limited to any specific non-absorbent granular material and, since the active ingredients of the liquid pesticide are not absorbed into the granules, they are more readily available and released. The use of non-absorbent granules also reduces the effect of absorbent materials in accelerating the decomposition of pesticides since the amount of absorbent material present in the liquid pesticide-absorbent coating is less than the amount present when the granules themselves are absorbent material.

The granular materials to which the method is applied have a particle size of about 10 to 90 mesh, preferably 20 to 60 mesh (Tyler screen) and any inert, non-absorbent, granular material may be used including calcite, talc, pyrophyllite, slate, silica sand, kaolin, gypsum, pumice stone, mica.

By liquid pesticide is meant a pesticide which remains liquid at ordinary temperatures, e.g., about 20° C. to about 30° C. in its ordinary technical form and suitable pesticides include O,O-diethyl O-2-(ethylthio) ethyl phosphorothioate, known as Systox I, O,O-diethyl S-2-(ethylthio) ethyl phosphorothioate, known as Systox II, which may be used in mixture with Systox I, 1,2-dichlorovinyl methyl sulfone, known as Chemagro D-113, and O,O-diethyl O-p-nitrophenyl phosphorothioate known as Parathion, O,O-diethyl S-2-(ethylthio) ethyl phosphorodithioate, known as Di-Syston, O, O-diethyl O-[4-(methylthio)-m-tolyl] phosphorothioate, known as Bayer 29492–X, O,O-dimethyl O-[4-(methylthio)-m-tolyl] phosphorothioate, known as Bayer 29493. Of course, in the broadest sense, the invention includes the use of other liquid pesticides, but these have been found particularly adaptable to the manufacturing process of the invention.

The absorbent dust employed is a finely powdered material having a particle size of about 0.5 to 100 microns, preferably 1 to 50 microns. Although the absorbent property required is available in many materials, all of which can be used, the materials found particularly useful are attapulgites such as Attaclay, diatomites such as Celite and Dicalite and montmorillonites such as Pike's Peak Clay. Likewise there can be used vermiculite, perlite, fuller's earth, synthetic silicates and kaolinites.

In the event that surfactants are used, suitable materials are an alkyl phenyl polyethylene glycol/alkyl aryl sulfonate blend such as Emcol HG-4, a polyoxyethylene sorbitant monooleate such as Tween 81, an alkyl aryl polyether alcohol such as Triton X-100 and an alkyl phenyl polyethylene glycol such as Tergitol NPX as well as other conventional materials including typical classes of surface active agents such as alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benzene sulfonates having 14 to 18 carbon atoms, alkylphenolethylene oxides, e.g., p-isooctyl phenol condensed with 10 ethylene oxide units, and soaps, e.g., sodium stearate and sodium oleate. Typical surface active agents are: Aerosol OS (sodium salt of propylate naphthalenesulfonic acid); Aerosol OT [(di-2-ethylhexyl) ester of sodium sulfosuccinic acid]; Alkanol B (sodium alkylnaphthalene sulfonate); Alrosene 31 (sodium salt of modified alcohol sulfate from cocoanut fatty acids); Arctic Syntex M (sodium salt sulfonated monoglyceride of cocoanut fatty acids); Areskap 100

[o-HOC$_6$H$_4$C$_6$H$_3$(C$_4$H$_9$)(SO$_3$Na)]

Areskap 300 [(C$_4$H$_9$)(SO$_3$Na)C$_6$H$_3$C$_6$H$_5$]; Arlacel C (sorbitan sesquioleate); Arquad 12 (mainly lauryltrimethyl ammonium chloride); Arquad 18 (mainly octadecyltrimethyl ammonium chloride); Brij 35 (polyethylene glycol lauryl ether); Daxad No. 11 (sodium salt of polymerized alkylated arene sulfonic acid); Duponol LS (sodium oleyl sulfate); Duponol WA (sodium lauryl sulfate); Emulsept

[CH$_3$(CH$_2$)$_n$COOCH$_2$CH$_2$NHCOCH$_2$NC$_5$H$_5$Cl$^-$]

Ethofats (polyethylene esters of fatty acids or rosin acids, e.g. Ethofat 3, 7, 11, 13, 15, 19, etc.); Ethomeens

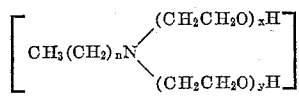

e.g., Ethomeen 8, 10, 12, 14, etc.; Ethomids

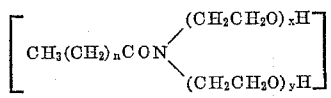

e.g. Ethomid 8, 10, 12, 14, etc.; Igepal CA (alkyl-phenyl polyethylene glycol ether); Igepon T (sodium N-methyl-N-oleyltaurate); Iegpon A (sodium oleyl isethionate); Intramine [(RCONHCH$_2$CH$_2$OSO$_3$Na) where RCOOH is commercial lauric acid containing myristic acid]; Invadine C (sodium alkylnaphthalene sulfonate); Leonil SA (sodium dibutyl naphthalene sulfonate); Marasperse C (sodium lignin sulfonate); Maypon 4C (protein-oleyl chloride condensation product); Miranols

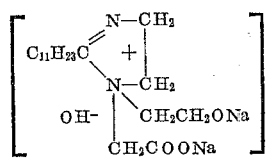

Myrj (polyethylene glycol stearate); Nacconol NR (sodium dodecyl benzene sulfonate); Wekal A (sodium salt of isopropylated naphthalenesulfonic acid); Nekal BX (sodium salt of butylated naphthalenesulfonic acid); Ninol 1281 (fatty acid ethanolamide); Nonic 218 (tertiary dodecyl polyethylene glycol thioether); Pluronics (condensation product of ethylene oxide and polypropylene glycol); Renex 25 (solidified urea complex of polyethylene glycol ester of mixed fatty and resin acids); Santomerse No. 1 (sodium dodecyl benzenesulfonate); Santomerge D (sodium decyl benzenesulfonate); Santomerse B [m-C$_6$H$_4$(COOC$_{12}$H$_{25}$)(SO$_3$Na)]; Sapamine KW

[CH$_3$(CH$_2$)$_7$CH=CH(CH$_2$)$_7$CONHCH$_2$CH$_2$N(CH$_3$)(C$_2$H$_5$)$_2$]$^+$[CH$_3$OSO$_3$]$^-$

Span 20 (sorbitan monolaurate); Span 40 (sorbitan monopalmitate); Span 60 (sorbitan monostearate); Span 80 (sorbitan monooleate); Sterox CD (polyethylene glycol ester of tall oil acids); Sulframin DR (sodium salt of sulfonated condensation product of ethanolamine with a fatty acid); Tergitol O8 [C$_4$H$_9$CH(C$_2$H$_5$)CH$_2$OSO$_3$Na]; Tergitol 4

[C$_4$H$_9$CH(C$_2$H$_5$)CH$_2$CH$_2$CH(CH$_2$CH(CH$_3$)$_2$)OSO$_3$Na]

Tergiton 7

[C$_4$H$_9$CH(C$_2$H$_5$)CH$_2$CH$_2$CH(CH$_2$CH$_2$CH(C$_2$H$_5$)$_2$)OSO$_3$Na]

Triton W-30

[p-C$_8$H$_{17}$C$_6$H$_4$(OCH$_2$CH$_2$)$_2$OSO$_3$Na where C$_8$H$_{17}$ is diisobutyl]

Triton X-100

[p-C$_8$H$_{17}$C$_6$H$_4$(OCH$_2$CH$_2$)$_n$OH where C$_8$H$_{17}$ is diisobutyl]

Tween 20 [tris (polyoxyethylene) sorbitan monolaurate]; Tween 40 [tris (polyoxyethylene) sorbitan monopalmitate]; Tween 60 [tris (polyoxyethylene) sorbitan monostearate]; Tween 80 [tris (polyoxyethylene) sorbitan monooleate]; Ultrawet SK (sodium alkylbenzene sulfonate); Ultravon K (sodium salt of sulfonated alkyl benzimidazole; Aerosol MA (sodium dihexyl sulfosuccinate); Nekal BV (sodium dibutyl naphthalenesulfonate); Dreft (an alkyl sulfate); and Turkey Red Oil.

Suitable thickening agents are colloidal silica, such as Cab-O-Sil and Santocel, colloidal attapulgite such as Attagel, Alkylammonium bentonite such as Bentone, e.g., Bentone 34 (dimethyl dioctadecyl ammonium bentonite) and polyvinyl pyrrolidone. Generally a thickening agent is not necessary for liquid pesticides having viscosities of 5 cps. or greater, but in other cases the thickener improves the cohesion of the pesticide mixture on the non-absorbent granules and should be used.

The relative amounts of the above materials which may be used are subject to variation, but should be used in amounts based on the weight of the final composition of from about 1% to about 20% liquid pesticide, about 0.2% to about 2.0% surfactant, and about 0.02% to about 1% of thickening agent, although, the surfactant and thickening agents in some cases may be omitted. As used herein, all percents and parts are by weight, and percents are based on the weight of the final composition unless otherwise indicated. The absorbent dust is used in an amount of about 1% to about 30% and the balance of the composition is the non-absorbent granular base.

While large amounts of liquid pesticide may be used, e.g., up to about 20% of the weight of the final composition, it is desirable to limit the amount coated on the granules to about 2.5%. If larger amounts are to be used, the coating process is repeated with increments of 2.5% pesticide being applied. The absorbent dust is added in the amount stated and should be sufficient to absorb all the free liquid in the blend of liquid pesticide and non-absorbent granules but not enough to remain a free-flowing powder not adhered to the granules when all the liquid is absorbed.

To carry out the coating, the non-absorbent granules are placed in a blender which is then set in operation. Liquid pesticide is added in an amount up to about 2.5% and the blending is continued until all the granules are evenly covered and have a wet sand consistency. Then the absorbent dust is added and blending is continued until all the granules are coated with the mixture of liquid pesticide and absorbent dust. In the event that a surfactant is added, it may be premixed with either the absorbent dust or the liquid pesticide, and, if a thickener is used, it too is premixed with either the liquid pesticide or the absorbent.

*Example I*

As an example of the preparation of a granular product, the following materials were used.

Solution A:
    1 lb. Emcol HG-4 emulsifier
    5.5 lbs. Technical Di-Syston

Mixture B:
    0.5 lb. Cab-O-Sil (colloidal silica)
    7.0 lbs. Celite 209 (a diatomite)

The materials of Mixture B were blended together until a homogeneous mixture resulted. 2.75 lbs. of solution A were added to 86.0 lbs. of white silica sand of about 30 to 60 mesh particle size range in a Nauta blender with the blender operating. After about three minutes the sand was evenly covered and then 3.75 lbs. of Mixture B was added and the blender was continued in operation until the sand granules were covered with a dry coating. An additional 2.75 lbs. of Solution A was added, and, after blending, an additional 3.75 lbs. of Mixture B was introduced into the blender. After continuing the blending until the granules again were covered with a dry coating a free-flowing, non-dusty granular product was obtained. The total blending time was about 20 minutes.

*Example II*

The procedure of Example I was repeated using Triton X-100 instead of Emcol HG-4 and similar results were obtained.

The method of this invention is advantageous in not being limited to any particular non-absorbent granular material or a particular shape of material, but can be used with any locally-available material having the desired particle size. The products obtained have the active ingredients coated on the surface of the granules where they are readily available and not absorbed in the interior of absorbent granules where they are not as available. This is especially true when a surfactant is used which is readily released. In addition, the use of non-absorbent granules reduces the decomposition of the liquid pesticide which is accelerated by absorbent granules since the amount of absorbent material to which the liquid pesticide is exposed is substantially reduced. The absorbent dust employed in the above-described process is present in a significantly smaller amount than the absorbent granules in the hitherto-used process of coating the pesticide on absorbent granules.

While the preferred form of the invention has been described, various changes may be made in the details of the process without departing from the scope of the invention as set forth in the claims.

I claim:

1. A method for manufacturing a granular pesticide composition having inert, non-absorbent granules coated with a liquid pesticide which remains liquid at 20 to 30° C. comprising blending together said liquid pesticide with said granules until the granules are evenly coated and have a wet sand-like consistency and then blending with the coated granules sufficient finely divided absorbent dust which is more finely divided than said granules to absorb the liquid pesticide until the free liquid is absorbed and the granules are covered with a dry coating.

2. A method for manufacturing a granular pesticide as set forth in claim 1 in which the amount of liquid pesticide is not greater than about 2.5% of the weight of the final composition.

3. A method for manufacturing a granular pesticide as set forth in claim 1 in which the granules have a particle size of about 20 to about 60 mesh and in which the absorbent dust consists of particles having a size between about 1 and 50 microns.

4. A method for manufacturing a granular pesticide as set forth in claim 1 in which the granules are selected from the group consisting of granules of talc, pyrophyllite, silica sand, calcite and slate and in which the absorbent dust is selected from the group consisting of attapulgite, montmorillonite and diatomite.

5. A method for manufacturing a granular pesticide composition as set forth in claim 1 in which the liquid pesticide is O,O-diethyl O-[4-(methylthio)-m-tolyl] phosphorothioate.

6. A method for manufacturing a granular pesticide composition as set forth in claim 1 in which the liquid pesticide is O,O-dimethyl O-[4-(methylthio)-m-tolyl] phosphorothioate.

7. A method for manufacturing a granular pesticide composition as set forth in claim 1 in which the liquid pesticide is 1,2-dichlorovinyl methyl sulfone.

8. A method for manufacturing a granular pesticide as set forth in claim 1 including blending the coated granules with an additional quantity of liquid pesticide not greater than about 2.5% of the weight of the final composition and then blending the granules with sufficient finely divided absorbent dust to absorb the liquid pesticide until the free liquid is absorbed and the granules are covered with a dry coating.

9. A method for manufacturing a granular pesticide as set forth in claim 8 including blending with said granules a thickening agent in an amount between about 0.02% and 1% of the final composition.

10. A method for manufacturing a granular pesticide as set forth in claim 9 in which the thickening agent is selected from the group consisting of colloidal silica, colloidal attapulgite, alkyl-ammonium bentonite and polyvinyl pyrrolidone.

References Cited in the file of this patent

UNITED STATES PATENTS

| | | |
|---|---|---|
| 2,330,227 | Lynn | Sept. 28, 1943 |
| 2,696,453 | Sanders | Dec. 7, 1954 |
| 2,760,900 | Glenn | Aug. 28, 1956 |
| 2,777,795 | Veaux | Jan. 15, 1957 |
| 2,868,688 | Benesi | Jan. 13, 1959 |
| 2,870,058 | Loder | Jan. 20, 1959 |
| 2,872,368 | Sanders | Feb. 3, 1959 |
| 2,898,267 | Linder | Aug. 4, 1959 |
| 2,941,922 | Gerolt | June 21, 1960 |

OTHER REFERENCES

Shell, Handbook of Aldrin, Dieldrin and Endrin Formulations, 1954, pages 11, 21 and 22.

Hanna: Handbook of Agricultural Chemicals, August 25, 1958, p. 281.